July 8, 1969    R. S. LANCTOT ET AL    3,454,046
FLOW CONTROL TRANSFER MECHANISM
Filed March 31, 1966
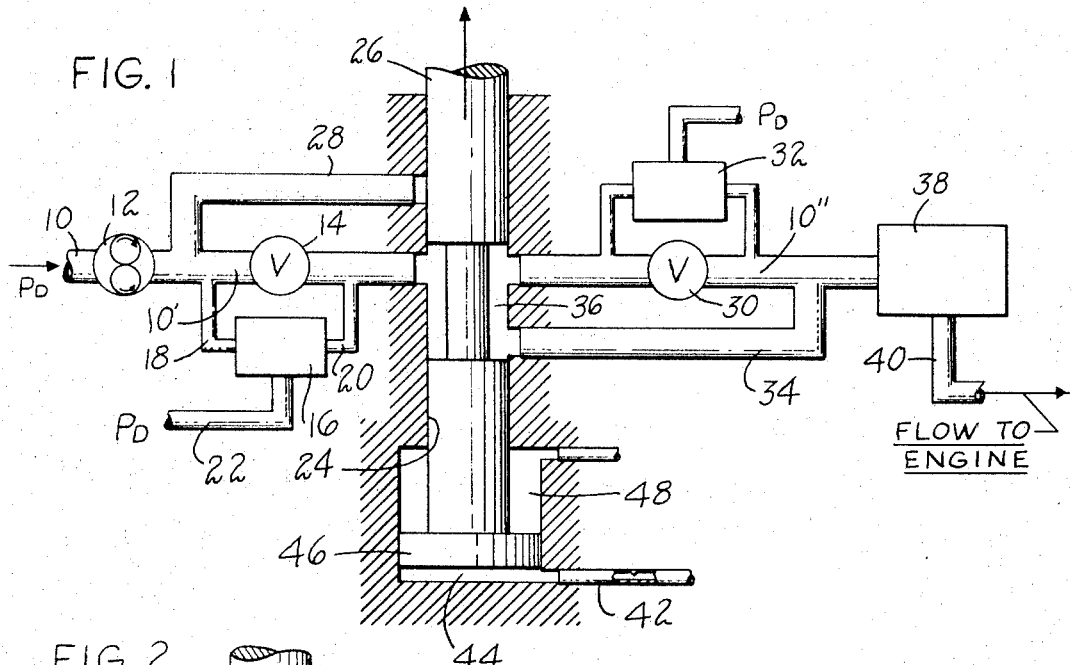
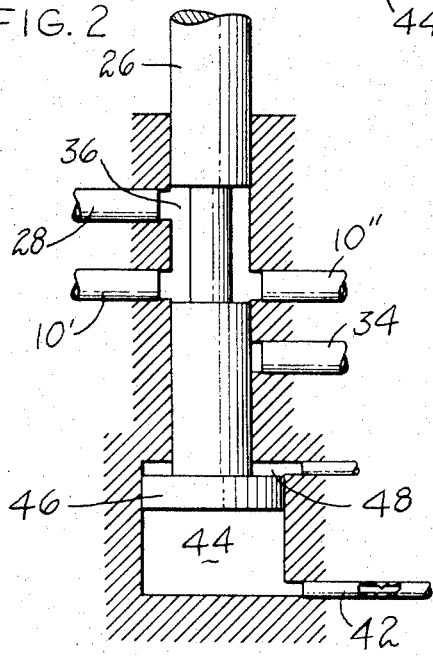
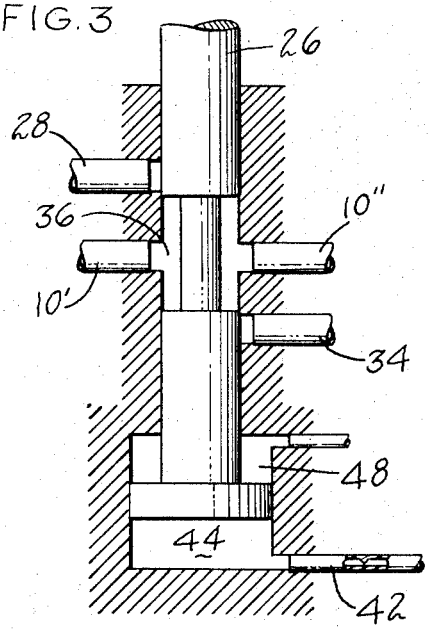
INVENTOR
ROBERT S. LANCTOT
FREDERICK E. SCHEIDLER
BY *Feshman and Van Kirk*
ATTORNEYS

United States Patent Office 3,454,046
Patented July 8, 1969

3,454,046
FLOW CONTROL TRANSFER MECHANISM
Robert S. Lanctot, Longmeadow, Mass., and Frederick E. Scheidler, West Hartford, Conn., assignors to United Aircraft Corporation, East Hartford, Conn., a corporation of Delaware
Filed Mar. 31, 1966, Ser. No. 539,086
Int. Cl. F17d 1/10
U.S. Cl. 137—599
8 Claims

ABSTRACT OF THE DISCLOSURE

A flow control transfer mechanism is provided for transferring flow control from one of two systems to the other. Each system has a metering valve and a bypass around the metering valve, only one of the two systems ordinarily functioning to meter fluid flow. The bypass in the functioning system is closed and the metering valve operates to meter fluid flow; the bypass in the other system being full open and the metering valve in the other system being closed. During transition from one system to the other, a valve closes both bypasses and both metering valves are caused to function.

---

This invention relates to a transfer mechanism for a fluid flow control system. More particularly, this invention relates to a transfer mechanism for a fuel control system whereby control of fuel flow can be transferred quickly and smoothly from an automatic control system to a manual control system.

In many fuel flow control systems, especially in fuel control systems for aircraft engines, a transfer system is provided to shift fuel flow control to an alternate emergency fuel control system in the event of a malfunction in the normal fluel flow control mechanism. In order to be effective, a transfer system of this type must be relatively fast acting and must operate in such a manner as to insure a smooth change over from the normal control system to the alternate control system.

The transfer mechanism of the present invention accomplishes relatively swift and smooth transition between a normal fuel control system and a manually operated fuel control system through the use of two throttle valves in series, with each throttle valve having a parallel bypass path. Except during the transition, only one of the throttle valves is operative, and the bypass around the particular operative throttle valve is closed to provide a flow path through the operative throttle valve and through the bypass around the other throttle valve. During transition, both bypasses are temporarily closed so that flow is directed through both metering valves to provide a smooth transition from one system to the other.

Accordingly, one object of the present invention is to produce a novel transfer mechanism for a fluid flow control system.

Another object of the present invention is to produce a novel transfer mechanism for an aircraft engine fuel flow control system.

Still another object of the present invention is to produce a novel transfer mechanism betweeen normal and alternate fuel flow control systems which accomplishes relatively quick and smooth transfer of fuel flow regulation from one system to the other.

Other objects and advantages will be apparent from the following detailed description and drawings.

In the drawings:

FIGURE 1 is a schematic showing of the transfer mechanism of the present invention during operation of the normal control system.

FIGURE 2 is a view showing part of the structure of FIGURE 1 during the transition operation.

FIGURE 3 is a partial showing of the apparatus of FIGURE 1 for operation of the alternate control system.

Referring now to FIGURE 1, fuel is delivered from a tank (not shown) via a conduit 10 to a pump 12 where it is pressurized for further flow through the system. A portion 10' of the conduit downstream of pump 12 has a throttle valve or metering valve 14 therein for metering the fuel flow, throttle valve 14 being the throttle valve for the normal fuel flow metering system. A standard type of pressure regulating valve 16 is placed across throttle valve 14 by branch conduits 18 and 20 to control the pressure drop across throttle valve 14 in a manner known in the art. Fuel that is bypassed by pressure regulating valve 16 is returned via conduit 22 to either the fuel tank or to the inlet of pump 12.

The downstream end of conduit 10', i.e., the end removed from the connection of conduit 10' to pump 12, is connected to a transfer passage 24. A spool type transfer valve 26 is located in transfer passage 24, transfer valve 26 being positioned as shown in FIGURE 1 for normal operation wherein fuel flow is metered by throttle valve 14. A bypass 28 leads from conduit 10' at a point upstream of throttle valve 14 to transfer passage 24. However, as shown in FIGURE 1, transfer valve 26 normally closes off the connection between bypass 28 and transfer passage 24.

On the downstream side of transfer passage 24 is a conduit 10" which, for simplicity of construction, is preferably a continuation of conduit 10. An alternate throttle valve 30, which may be manually operated, is located in conduit 10" to provide an alternate metering mechanism for fuel flow. A pressure regulating valve 32 similar to pressure regulating valve 16 is placed across throttle valve 30 to regulate the pressure drop across valve 30. A bypass 34 forming an alternate flow path to the downstream end of conduit 10" extends from transfer passage 24 to conduit 10" at a point downstream of throttle valve 30.

As can be seen in FIGURE 1, during operation of the normal fuel flow control system fuel from pump 12 flows through conduit 10' where it is metered by throttle valve 14 and then delivered to an annular chamber 36 defined in transfer passage 24 by transfer valve 26. No fuel can flow through the alternate flow path of bypass 28 since the connection between bypass 28 and transfer passage 24 is closed off by transfer valve 26. The fuel flow delivered to annular chamber 36 passes via bypass 34 to conduit 10" and thence through a standard type of shut off valve 38 and a conduit 40 to a fuel consuming load such as an aircraft engine. Since throttle valve 30 constitutes a restriction in conduit 10" upstream of the connection of bypass 34 to conduit 10", no fuel, or at most only insignificant amounts of fuel, passes through throttle valve 30 during the operation of the system as depicted in FIGURE 1. The normal action of pressure regulating valve 32 causes it to close as a result of the lack of flow, or low flow, through throttle valve 30 which results in little or no pressure drop across valve 30, and thus valve 32 does not constitute a drain during operation of the normal fuel system.

In order to transfer regulation of fuel flow from normal throttle valve 14 to alternate throttle valve 30, a transfer signal in the form of an increased hydraulic pressure is delivered via conduit 42 to a chamber 44 in which is located a piston 46 connected to transfer valve 26. The increased pressure signal in chamber 44 drives transfer valve 26 upward until it assumes the position shown in FIGURE 2.

Referring now to FIGURE 2, bypass 28 is now open to transfer passage 24 since annular chamber 36 has been raised to a position to communicate with bypass 28. Therefore, flow from pump 12 passes through bypass 28 rather than through conduit 10' which is restricted by throttle valve 14. The reduction of flow through throttle valve 14 results in the closing of pressure regulating valve 16 in the normal course of its operation to prevent any recirculating bypass via conduit 22. As can also be seen in FIGURE 2, the upward position of transfer valve 26 closes off the connection between bypass 34 and transfer passage 24 so that the fuel passing through bypass 28 to transfer passage 24 is now delivered to conduit 10'' where it is metered by throttle valve 30 and delivered to the fuel consuming load via shut off valve 38 and conduit 40. The flow through throttle valve 30 causes previously closed pressure regulating valve 32 to become operative to regulate the pressure drop across valve 30. Transfer valve 26 acts as a selector device to determine, in accordance with its position, the particular throttle valve which is to perform the metering function. Movement of transfer valve 26 from the FIGURE 1 position to the FIGURE 2 position can be accomplished in a time of about one second so that a speedy transfer from the normal regulating system to the alternate regulating system can be accomplished.

Referring now to FIGURE 3, it can be seen that during transition of transfer valve 26 from the FIGURE 1 position to the FIGURE 3 position transfer valve 26 closes off both bypass 28 and bypass 34 from transfer passage 24. The movement of transfer valve 26 from one position to the other is rate limited to insure that the condition depicted in FIGURE 3 prevails for a significant part of the transfer time from one position to the other. When both bypass 28 and bypass 34 are closed off from transfer passage 24, flow from pump 12 passes through conduit 10' and throttle valve 14 and thence through conduit 10'' and throttle valve 30. In this manner, throttle valve 30 is caused to start metering while flow is still also being metered through throttle valve 14. Thus, throttle valve 30 is gradually put into operation rather than having the entire metering load dumped upon it instantaneously. In this manner, a smooth transition is accomplished in the transfer of the metering function from throttle valve 14 to throttle valve 30.

Transfer of the metering function from throttle valve 30 to throttle valve 14 can be accomplished by reducing the pressure in chamber 44, in which event the pressure in chamber 48 will drive transfer valve 26 downward to return it to the position shown in FIGURE 1. The downward motion of transfer valve 26 will cause the above described process to be reversed to retransfer the metering function from throttle valve 30 to throttle valve 14 in the speedy and smooth manner described.

If desired, whenever the metering function is transferred from one throttle valve to the other the pressure regulating valve across that one throttle valve may be supplied with a signal to insure closing of that pressure regulating valve.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:
1. In a fluid flow control system:
conduit means;
a first throttle valve in said conduit means;
a second throttle valve in said conduit means downstream of said first throttle valve;
a first bypass around said first throttle valve;
a second bypass around said second throttle valve;
a source of fluid under pressure connected to said conduit means upstream of said first throttle valve;
a fluid consuming load connected to said conduit means downstream of said second throttle valve;
and selector means for closing the bypass around one of said throttle valves and opening the bypass around the other of said throttle valves to cause said one throttle valve to regulate fluid flow from said source through the bypass around the other of said throttle valves to said load;
said selector means including passage means connected between said first and second bypasses and further including valve means in said passage means, said valve means selectively connecting one of said bypasses to said passage means and disconnecting the other of said bypasses from said passage means.

2. A fluid flow control system as in claim 1 including means for actuating said selector means to open the bypass around said one throttle valve and close the bypass around said other throttle valve to cause said other throttle valve to regulate fluid flow from said source through said bypass around said one throttle valve to said load.

3. A fluid flow control system as in claim 2 including means for closing both of said bypasses during part of the actuation of said selector means to direct fluid flow from said source through both of said throttle valves to said load.

4. In a fluid flow control system:
a source of fluid under pressure;
a first conduit, said first conduit being connected at the upstream end thereof to receive fluid from said source;
a first throttle valve in said first conduit;
a transfer passage, the downstream end of said first conduit being connected to said transfer passage;
a first bypass around said first throttle valve, one end of said first bypass being connected to said first conduit upstream of said first throttle valve and the other end of said first bypass being connected to said transfer passage;
a second conduit, the upstream end of said second conduit being connected to said transfer passage and the downstream end of said second conduit being connected to a fluid consuming load;
a second throttle valve in said second conduit;
a second bypass around said second throttle valve, one end of said second bypass being connected to said transfer passage and the other end of said second bypass being connected to said second conduit downstream of said second throttle valve;
selector means in said transfer passage, said selector means normally being positioned to close off said first bypass from said transfer passage and open said second bypass to said transfer passage to cause said one throttle valve to regulate fluid flow from said source through said first conduit and through said second bypass to said load.

5. A fluid flow control system as in claim 4 including means for actuating said selector means from said normal position to an alternate position to open said first bypass to said transfer passage and close said second bypass to said transfer passage to cause said second throttle valve to regulate fluid flow from said source through said first bypass and through said second conduit to said load.

6. A fluid flow control system as in claim 5 including means for closing both the connection between said first bypass and said transfer passage and the connection between said second bypass and said transfer passage during part of the actuation of said selector means to direct fluid flow from said source through both said first and second conduits.

7. In a fluid flow control system:
a source of fluid under pressure;
a first conduit, said first conduit being connected at the upstream end thereof to receive fluid from said source;
a first throttle valve in said first conduit;
a transfer passage, the downstream end of said first conduit being connected to said transfer passage;
a first bypass around said first throttle valve, one end of said first bypass being connected to said first conduit upstream of said first throttle valve and the other end of said first bypass being connected to said transfer passage;

a second conduit, the upstream end of said second conduit being connected to said transfer passage and the downstream end of said second conduit being connected to a fluid consuming load;

a second throttle valve in said second conduit;

a second bypass around said second throttle valve, one end of said second bypass being connected to said transfer passage and the other end of said second bypass being connected to said second conduit downstream of said second throttle valve;

selector means in said transfer passage, said selector means normally being positioned to close off said first bypass from said transfer passage and open said second bypass to said transfer passage to cause said one throttle valve to regulate fluid flow from said first conduit and through said second bypass to said load, said selector means being movable to an alternate position, said selector means including valve means dimensioned to close both the connection bebetween said first bypass and said transfer passage and the connection between said second bypass and said transfer passage during movement to said alternate position.

8. A fluid flow control system as in claim 7 including means for actuating said selector means from said normal position to an alternate position to open said first bypass to said transfer passage and close said second bypass to said transfer passage to cause said second throttle valve to regulate fluid flow from said source through said first bypass and through said second conduit to said load.

References Cited

UNITED STATES PATENTS

| 624,821 | 5/1899 | Kinner | 137—599.1 |
| 3,083,721 | 4/1963 | Matthews et al. | 137—599 X |

FOREIGN PATENTS 784,581  10/1957  Great Britain.

WILLIAM F. O'DEA, *Primary Examiner.*

DENNIS H. LAMBERT, *Assistant Examiner.*

U.S. Cl. X.R.

137—625.13, 625.34

PO-1050
(5/69)

UNITED STATES PATENT OFFICE
CERTIFICATE OF CORRECTION

Patent No. 3,454,046          Dated July 8, 1969

Inventor(s) R. S. LANCTOT ET AL

It is certified that error appears in the above-identified patent and that said Letters Patent are hereby corrected as shown below:

In Claim 7, at column 5, line 17, after "said" insert --source through said--

SIGNED AND
SEALED
OCT 21 1969

(SEAL)
Attest:

Edward M. Fletcher, Jr.
Attesting Officer

WILLIAM E. SCHUYLER, JR.
Commissioner of Patents